US008196776B2

(12) United States Patent  (10) Patent No.: US 8,196,776 B2
Doglioni Majer  (45) Date of Patent: Jun. 12, 2012

(54) APPARATUS AND METHOD OF CONTROLLING BEVERAGE DISPENSING MACHINES

(75) Inventor: Luca Doglioni Majer, Carate Urio (IT)

(73) Assignee: Rhea Vendors, S.p.A., Caronno Pertusella (VA) (IT)

( * ) Notice: Subject to any disclaimer, the term of this patent is extended or adjusted under 35 U.S.C. 154(b) by 888 days.

(21) Appl. No.: 12/160,468

(22) PCT Filed: Jan. 15, 2007

(86) PCT No.: PCT/IB2007/000097
§ 371 (c)(1),
(2), (4) Date: Aug. 11, 2008

(87) PCT Pub. No.: WO2007/085925
PCT Pub. Date: Aug. 2, 2007

(65) Prior Publication Data
US 2010/0161140 A1  Jun. 24, 2010

(30) Foreign Application Priority Data
Jan. 24, 2006 (EP) .................................... 06001478

(51) Int. Cl.
*G01F 11/00* (2006.01)
(52) U.S. Cl. ............. 222/1; 222/52; 222/64; 222/129.1; 222/129.3; 99/280; 700/281

(58) Field of Classification Search ................ 222/1, 52, 222/55, 59, 129.1, 129.3, 64; 700/281, 283; 99/280
See application file for complete search history.

(56) References Cited

U.S. PATENT DOCUMENTS
4,360,128 A * 11/1982 Neumann ........................ 222/26
6,321,506 B1    11/2001 Rolland
7,163,126 B2 *  1/2007 Knepler ........................... 222/52

FOREIGN PATENT DOCUMENTS
EP  0728664 A  8/1996
FR  2367275 A  5/1978
* cited by examiner

*Primary Examiner* — Frederick C. Nicolas
(74) *Attorney, Agent, or Firm* — Hess Patent Law Firm, PC; Robert J. Hess

(57) ABSTRACT

An apparatus and a method for controlling a beverage dispensing machine. The apparatus performs the method and the method includes steps of monitoring, through a sensing device, the ingredient amount/level and/or the shape of the surface of the ingredient within the container, comparing the monitored value with a reference value stored in a machine control unit, and changing one or more operative parameters of the beverage dispensing machine, when necessary on the basis of the comparison. The monitoring may include detecting a distance between the sensing device, which is positioned above the ingredient, and at least one point of an upper surface of the ingredient. The operative parameters may be operating time of the machine to draw the ingredient from the container, an amount of ingredient drawn from the container, and an operating time or condition of other machine units.

17 Claims, 2 Drawing Sheets

APPARATUS AND METHOD OF CONTROLLING BEVERAGE DISPENSING MACHINES

BACKGROUND OF THE INVENTION

The present invention relates to an apparatus and a method of controlling beverage dispensing machines, in particular of controlling automatic beverage dispensing machines for home or office use, or to be installed in food-service sites or in so called HoReCa (Hotel-Restaurant-Cafe) sites.

For the purposes of the present invention, the word "beverage" means the product resulting from several preparation methods such as, for instance, brewing, solubilisation of instant edible powders, freezing, chilling or heating drinking water, etc.

Available dispensing machines provide several types of beverages such as, for instance, coffee, tea, cappuccino, juices, chocolate, water, drinks, which are automatically prepared with no need for the user to intervene in the preparation process.

Usually preparation of a beverage is carried out by the dispensing machine according to preset sequences. Each preparation sequence requires the machine to perform one or more tasks such as, grinding a measured amount of coffee beans, brewing the coffee for a preset time lapse, mixing the liquid coffee with milk, etc. Each task is carried out by one or more machine units, for instance a boiler, a grinder, a mixer, a feeder, etc.

Recently, beverage dispensing machines have been provided with apparatuses for controlling their operation. Control apparatuses check several operating parameters of the related machine and eventually intervene to modify operation of one or more units to compensate undesired alterations in the beverage preparation process. For instance this allows for preserving the quality of the dispensed beverage despite of undesired changes of the machine operating parameters (i.e. the brewing parameters), or switching the machine into a "sold-out" condition when a certain ingredient is no more available.

Some beverage dispensing machines are equipped with micro-processors capable of executing multiple checks and controls over the machine units.

European patent application n. EP 04031014.6, in the name of Rhea Vendors S.p.A., discloses a method for controlling coffee dispensing machines through monitoring of real-time data concerning brewing parameters, comparing said real-time data to a set of historic data and/or threshold parameters and altering at least one of said relevant brewing parameters, when required to bring said real time parameters in line with said recorded parameters.

Dispensing machines are known provided with simple on-off switches which do control the presence of an ingredient in the related container, but this information is used to simply block dispensing of the beverage prepared with such ingredient, i.e. to set the machine in the "sold-out" condition.

For instance EP 0010448, in the name of "VGL IND LTD", relates to an apparatus for indicating the availability of ingredients to be dispensed. The apparatus is provided with a light source and a sensor which together define a light path across the neck portion of a suitable ingredient container. When the ingredient level falls below the light path the incident light impinging the sensor is increased, thereby providing an indication that the ingredients are "sold out". An alternative optical apparatus is disclosed in the Japanese patent application n. JP2004354143, in the name of "Fuji Seiki KK".

Other known apparatuses provide recognition of an ingredient sold-out condition on the basis of the statistical evaluation of the ingredient consumption. For instance the average throughputs per ingredient type are taken into account, thereby deducting a correspondent theoretical amount at each dispensing cycle (reverse counting feature) and blocking the access to that particular dispensing cycle if the ingredient is estimated run out. These apparatuses do not tolerate changes in the ingredient throughputs from the estimated average values without occurring in mistakes when evaluating the sold-out condition for the ingredient. Another drawback of such apparatuses is that they require to re-set the "reverse counting" at each machine filling, usually by intervening on a suitable controller means, and also require to fully fill the container with the ingredient or, alternatively, to manually input the exact level of the container (or of each container) into a controller unit. These procedures are rather complex, potentially inaccurate and time consuming.

A problem common to known beverage dispensing machines relates to the proper dosing of the ingredient.

Dispensing machines are usually provided with an endless feeding screw for drawing a powder ingredient from the relevant container and supply it to another unit of the machine, for processing and beverage preparation. Such screw is located at the bottom of the container and is operated for a preset time, corresponding to a preset number of turns and, therefore, to a preset amount of powder. It is recognized that the ingredient dose supplied by the feeding screw depends on the pressure exerted by the mass of the ingredient on the portion of ingredient located at the inlet of the feeding screw. In fact when the container is almost empty, the pressure exerted on the ingredient at the inlet of the feeding screw is minimum, and a lesser amount of ingredient enters the screw. Therefore, the ingredient dose supplied by the feeding screw is less than the dose fed when operating with full container, this causing undesired changes in the operating parameters and in the characteristics of the dispensed beverage. The same or similar drawback has been found in "R&G" (roast and ground) coffee dispensing machines and in machines wherein coffee beans or ice-cubes are processed.

Still another problem of known beverage dispensing machines relates to clogging of the feeding screw by ingredient aggregates. In certain circumstances, such as at high humidity levels or when using hygroscopic ingredients, the same ingredients tend to aggregate and form lumps or bridges in the container. Aggregates interfere with normal free-flowing movement of the ingredient toward and within the feeding screw or other, equivalent drawing means. When such a situation occurs, attendance by an operator is required to disaggregate the lumps and restore the proper operation of the machine.

SUMMARY OF THE INVENTION

It is an object of the present invention to provide an apparatus and a method for controlling beverage dispensing machines which effectively overcome the drawbacks of prior art solutions, being at the same time simple to implement and operate.

It is another object of the present invention to provide an apparatus and a method for controlling beverage dispensing machines, in particular for controlling automatic hot and cold beverage dispensing machines for home or office/HoReCa use, which allow for the effective monitoring of the ingredient (s) content in one or more containers of the machine and for controlling the machine operation on the basis of the monitored information.

It is still an object of the present invention to provide an apparatus and a method for controlling beverage dispensing machines, in particular for controlling automatic hot and cold beverage dispensing machines for home or office/HoReCa use, which allow for the monitoring of the ingredient amount in one or more containers of the machine and for implementing a feedback control over the machine operation on the basis of the acquired data related to such ingredient(s), thereby compensating possible variations from the preset operative parameters.

It is another object of the present invention to provide an apparatus and a method for controlling beverage dispensing machines, which allow for the monitoring the presence of ingredient aggregates in one or more containers, thus permitting to intervene with the necessary attendance.

These and other objects are achieved by the present invention which relates to a method for controlling a beverage dispensing machine as set forth in claim 1.

Advantageously, the method according to the present invention allows for compensating possible variations from the preset routines due to shortage of the ingredient within the container or to the formation of aggregates which interfere with the ingredient drawing. The sensing means collect information concerning the ingredient amount, or level, within the container and/or information concerning the shape of the ingredient surface, i.e. the way the ingredient settle or stand at its free surface, this permitting recognition of the aggregates.

Differently from prior art solutions, wherein monitoring of the amount/level of the ingredient in the container is only for setting the machine in the "sold out" configuration, the method according to the present invention provides a control over the machine operation, on the basis of such monitoring.

By carrying out the method of the present invention it is possible to avoid the machine from dispensing the so called "aborted vends", i.e. dispensing only a part of the drink (e.g. the cup and water but no soluble ingredient, or an insufficient amount of ingredient), this evidently bothering the customer. When an ingredient is running out, or when its proper supply is reduced due to the clogging (at least partially) of the feeding screw by an aggregate, the machine control unit operates so as to compensate the reduction in the amount of ingredient available for a drink.

For instance, when the ingredient is running out and the amount entering the feeding screw diminishes, the control unit controls the feeding screw so as to increase its operating time, thus restoring the proper amount of ingredient supplied for the drink.

When the ingredient is run out, the control means sets the machine into the "sold-out" condition for the drinks prepared with that ingredient.

When ingredient aggregates are detected by monitoring the shape of the upper ingredient surface, i.e. the surface facing the container lid, the control unit activates a means for breaking such aggregates, for instance mechanical means such as wheels or blades rotating in the container, or a device to selectively impart vibrations to the container or to a metallic base holding the container or other equivalent means.

Acquiring information about the ingredient content is accomplished by way of a sensing means capable of detecting the amount or the level of the ingredient in the container by measuring its distance from at least one point of the top surface of the ingredient. A sensor is preferably located on the container lid and generates a signal which is directed toward the ingredient upper surface. A receiver, preferably integrated with the sensor, is provided for receiving the signal coming back from the ingredient mass, for instance reflected. Processing such a signal by the control unit, typically by comparing the value of the signal with one or with a set of reference/threshold values, allows for detecting the amount of ingredient contained in the container.

Preferably the signal emitted by the sensing means trespasses the wall of the container (or of the lid) but not the ingredient contained therein. Thus the signal is reflected by the ingredient and tracked by the sensing means for processing.

By detecting the distance between sensing means and at least two points of the surface, or by scanning the surface of the ingredient, for instance by way of a plurality of optical sensors/receivers or by way of an ultrasonic emitter/receiver, the control unit can acquire information about the shape of the ingredient surface. By valuating and comparing such information at each dispensing cycle, the control unit can detect the presence of ingredient agglomerates.

Moreover the method according to the present invention allows for collecting information about the ingredient consumption for statistical purposes. This can be accomplished by providing the control unit with transmission means for providing the acquired information to a remote monitoring unit, for example the dispensing machine manufacturer. The control unit can communicate with the monitoring unit through a telephone line or internet, via bluetooth, sms, etc. . . . In this way the manufacturer can acquire useful information about customers' preferences and the machine operation.

Another advantage of the method according to the present invention is that incongruous consumptions of ingredients can be detected by comparing the monitored amount of ingredient(s) with a set of standard and/or historical data, thus allowing the control unit for compensating inconsistencies (by changing one or more operative parameters of the dispensing machine) or generating an error signal for a maintenance operation.

Monitoring of the amount/level of each ingredient within the respective container permits to correlate such quantities with other information, such as the loading routines performed by the personnel in charge for filling and cleaning the dispensers, the amount/level of each ingredient loaded, thus providing useful statistical information about the machine operation in time, with particular regard for the operations carried out in a drink preparation process. In general, the acquired information is used by the control unit for compensating possible inconsistencies of the operative parameters, when necessary upon comparison between the data gained by the sensing means and the data stored in a memory of the same control unit.

The present invention also relates to an apparatus for controlling a beverage dispensing machine as set forth in claim 9.

The sensing means comprises a sensor, which can be magnetic, optical, ultrasonic, etc., for generating a signal travelling toward the ingredient contained within the container and a receiver for receiving the signal back from the ingredient. The signal received by the sensing means is processed by the control unit for estimating the amount/level of the ingredient in the respective container and/or the shape of the ingredient surface.

The control unit is provided with a memory into which reference values or thresholds of the monitored quantities are stored. The control unit carries out a comparison between the signal collected by the receiver and the stored information, in order to recognize the actual amount or level of the ingredient or the actual shape of its surface. At each dispensing cycle a dose of the ingredient is drawn from the container, thereby diminishing the level of the same ingredient or affecting the shape of its upper surface. At preset time intervals the control unit carries out the aforesaid comparison and recognized the new level of the ingredient. According to the method of the present invention, such information can be sent to a remote monitoring unit, for instance to the manufacturer or the service provider, via Internet, telephone line, wireless, etc.

As above mentioned, the shape of the ingredient surface can be monitored by detecting the distance of the ingredient from the sensor in at least two points e.g. by scanning the ingredient surface, with the sensing means. Preferably the sensor is located on the container lid and emits a signal for scanning the upper surface of the ingredient. For example an ultrasonic emitter/receiver can detect, at least approximately, the shape of the upper surface of the ingredient standing in the container. Alternatively a plurality of sensors can be used, for instance infrared emitters/receivers, each sensor for scanning a region of the surface and detecting its height with respect to a reference level, thus permitting to define, at least approximately, the shape of the surface.

If drawing of the ingredient form the container is achieved through a feeding screw centrally located at the container bottom, the ingredient surface has a regular or funnel shape, which can be considered as the reference shape. It is understood that other reference shapes can be considered depending on the shape of the container and the location of the screw. If clogging occurs, due to formation of ingredient aggregates, the shape of the surface changes, for instance turning hilly. The control unit can activate suitable mechanical means for breaking such aggregates. For instance rotating blades or other tools can be used.

BRIEF DESCRIPTION OF THE DRAWING

Further advantages and features of the present invention will become apparent from the following detailed description with reference to the drawings enclosed as a non-restrictive example, where.

DETAILED DESCRIPTION OF THE INVENTION

Figure 1:
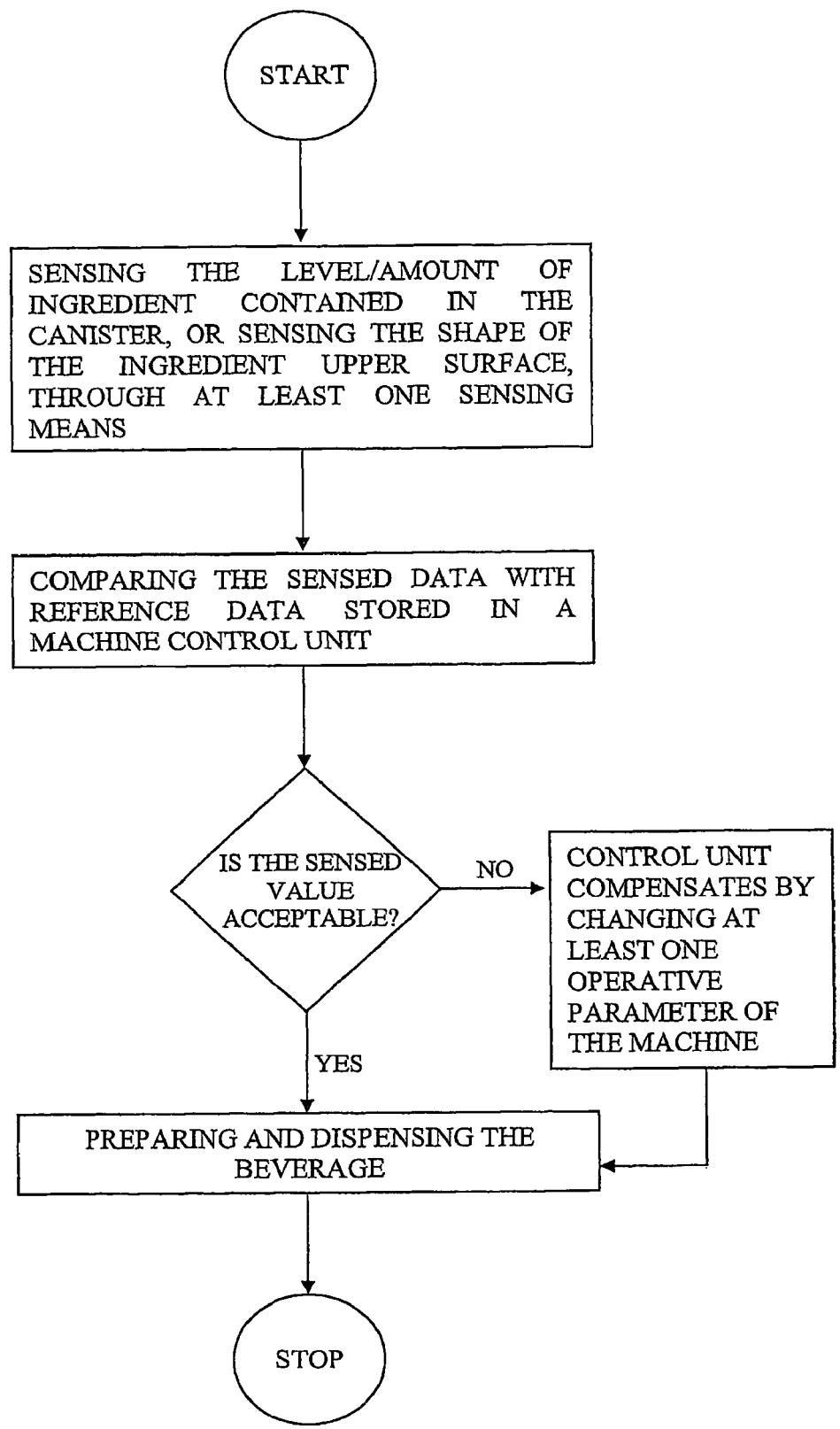
FIG. 1 is a flow chart of the method according to the present invention.
Figure 2:
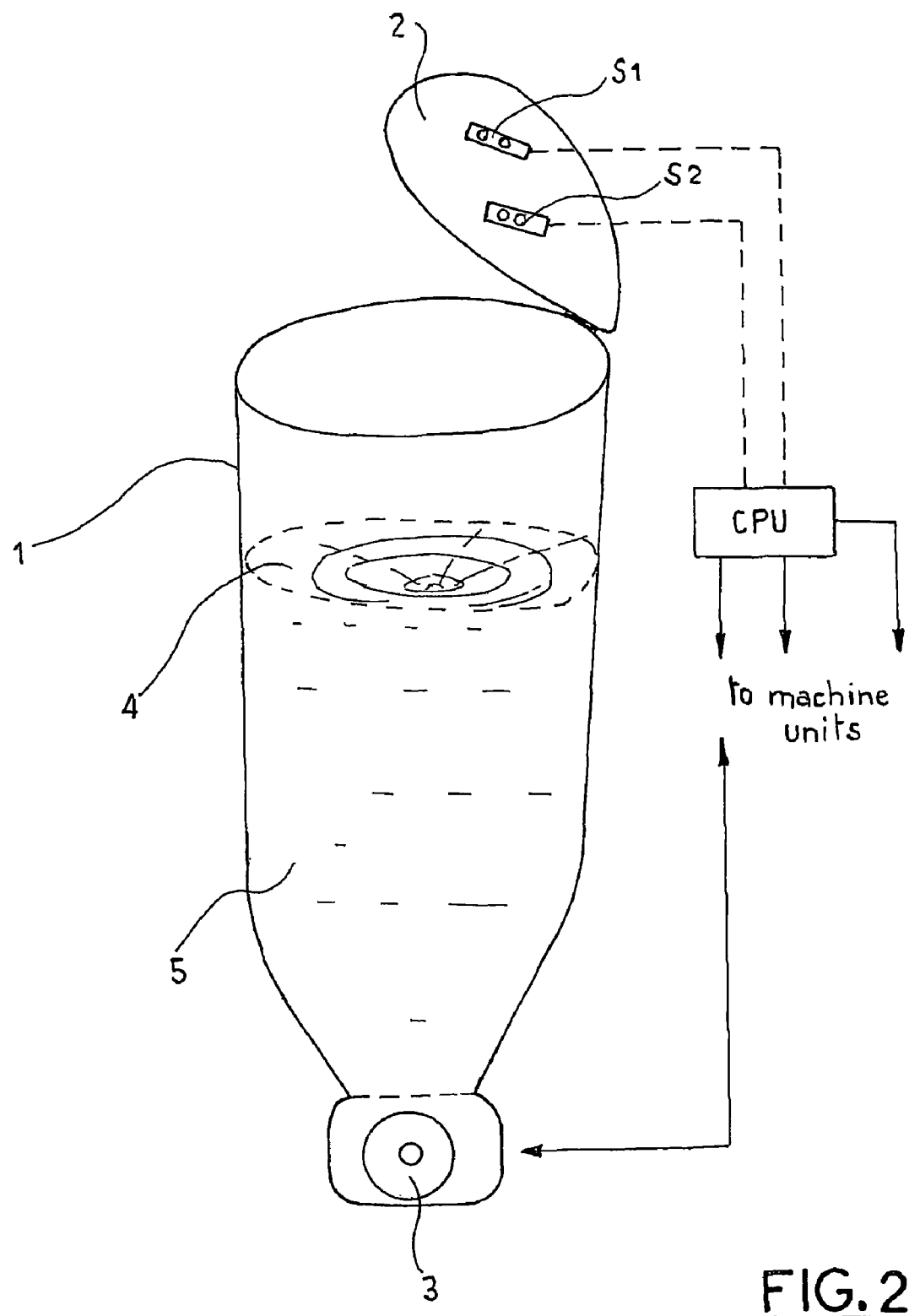
FIG. 2 is a schematic perspective view of an apparatus according to the present invention.

With reference to FIGS. 1 and 2, the beverage dispensing machine, usually enclosed in a frame cabinet to meet different design needs, typically has several functions managed by an electronic controller CPU (Control Processing Unit). The CPU performs multiple tasks, such as operating the proper dosing of the ingredients, heating of the water, control over the pumps, etc.

The beverage dispensing machine is provided with one or more containers for the beverage ingredients, e.g. containers 1, each containing an ingredient, such as coffee, chocolate, syrups, water, ice, etc., to be supplied for preparing a drink. Container 1 is usually made in blow-moulded or injection-moulded plastic materials, although it can be made of other materials such as rubber, metal or glass.

Each container 1 is provided with a top lid or cover 2 which avoids the ingredient contained therein from directly contacting contaminants which may be present in the air and on surfaces inside the machine cabinet, such as dust, humidity, etc. Lid 2 can be hinged to the body of the container 1, or can be separated from the same.

The lid 2 can be made of the same material of the container 1 or, alternatively, a different one. Preferably, at least a portion of lid 2 is transparent to the signals generated by the sensor means.

The container 1, has a conical shape to promote gathering of the ingredient at the bottom, wherein a drawing device 3 is provided, such as a feeding screw, a centrifugal milling unit, etc. The device 3 allows for supplying the dose for the preparation of the related drink.

The apparatus according to the present invention is provided with sensing means S1, S2 for detecting the amount or the level of the ingredient contained in the respective container 1. Such sensing means is preferably located on the lid 2. Alternatively it can be provided on the body of container 1, in a lateral position.

Sensing means S1, S2 can detect the amount/level of a powder or a liquid contained in the container 1 by generating at least one signal that is reflected by the top surface of the ingredient and detected by the sensor. This can be accomplished by using sensors S1, S2 which emit a signal (ultrasonic, infrared, laser, magnetic, etc.) impinging the ingredient top surface and respective receivers which receive the signal reflected by the same ingredient for processing by the CPU.

Preferably a single infrared sensor S1 is used which emits an infrared beam toward the upper surface of the ingredient in the container 1 and receives the reflected beam (sensor S1 operates as emitter and receiver). The CPU evaluates the time the beam spends to travel from the sensor S1 to the ingredient upper surface and back to the sensor S1, thus providing a measure of the distance of the top surface 4 of the ingredient 5 from the sensor S1 located on lid 2. The level of ingredient 5 within container 1 can thus be assessed.

In general sensors S1, S2 are chosen to generate a signal which trespasses the solid surface of the lid 2 from outside but not the solid upper surface of the ingredient, thus permitting the CPU to determine the height of said ingredient within the container 1 with a fair approximation. In other words the lid is transparent for the signal emitted by the sensor S1, S2 located on its outside.

According to the method of the present invention, the information about the amount or the level of the ingredient is used by the CPU for optimizing the beverage preparation process.

For instance, when the CPU detects a condition wherein the ingredient is running out, i.e. when the height of the ingredient is close to the minimum, the same CPU operates the feeding screw so as to run for a longer time with respect to normal conditions, thereby compensating any diminishing of the ingredient amount processed by the screw.

The sensor means S1, S2 can be operated for recognizing the shape of the ingredient upper surface 4. In other words, the sensor S1 and/or the sensor S2 can detect the distance, i.e. the level, of the top surface 4 of ingredient 5 at two or more points of the surface and thus operate a scanning of the ingredient surface 4 facing the container lid 2; the correspondent signals are processed by the CPU to allow for detecting, at least approximately, the shape of surface 4.

One or more sensors S1, S2 can be provided for this purpose. The shape of the upper surface 4 can be obtained by using laser sensors scanning the surface 4 or by using other sensors (infrared, ultrasonic, etc.) and detecting the height of the ingredient at two or more surface 4 locations, thereby allowing the CPU to create a virtual map of the surface 4.

By comparing the shape of the upper surface 4 before and after one or more dispensing cycle, it is possible to check if aggregates or clumps are generated within the ingredient. If the level of the ingredient does not vary substantially, aggregates or "stuck ingredients" may be present in the container, clogging the drawing means 3. The CPU will then activate the means for breaking the aggregates. The same applies if the shape of the upper surface 4 changes to, for instance, a hilly shape.

An expected drop (with respect to the dispensed drinks) of the ingredient level, and the upper surface 4 remaining funnel-shaped, are indications that the ingredient did not generate aggregates ("unstuck ingredients").

An unexpected drop of the ingredient level and a changing of the upper surface 4 shape from hilly to a funnel shape indicate that the aggregates have been broken and the ingredient is being drawing correctly, i.e. the proper dose of ingredient is drawn for preparing the drink.

On the basis of the aforesaid comparison, the CPU is able to rapidly signal possible malfunctions or abnormal situations requiring a change in the preset parameters. This can be made visible to the user or the technicians for example by way of appropriate communication means such as displays, modem lines, optical ports, bluetooth interfaces, etc.

All the information gained by the CPU through the sensing means and other units of the dispensing machine is stored in a memory. This allows for processing such information, for instance for statistical purposes, any time.

The CPU can compare a set of pre-programmed reference data, such as average data related to the deviation from the dosing as made by the dosing device in a full container situation, to the volume of the remaining ingredient detected by the sensing means S1, S2 in order to provide several information, such as the number of servings available in the container before a re-fill is needed.

The method and the apparatus according to the present invention can be applied also for optimizing the performance of dispensing machines wherein the containers contain, ice cubes, powder ingredients, coffee beans, syrup, etc. Liquid ingredient containers, such as bag-in-box plastic containers, may also be provided.

Rotating blades or wheels can be used for breaking the aggregates, such blades or wheels being immersed in the ingredient.

The apparatus according to the present invention can carry out a checking of the type and quality of the ingredient filled in the container. A bar-code reader can be installed on the container lid 2 to read a bar-code associated to the ingredient being filled into the container. The bar code can be provided by the ingredient seller, giving information about the quality and the amount of ingredient sold in a container, bag, blister, etc.

The apparatus can also comprise a switch operated by the lid 2 during opening. The CPU, connected to the switch, can measure the time lapse corresponding to the lid 2 being opened, for instance during re-fill of the ingredient. This information, i.e. counting the time corresponding to the opened container, can be useful for ascertaining proper storage of the ingredient.

The invention claimed is:

1. A method of controlling a beverage dispensing machine provided with at least one container containing an ingredient for preparing said beverage, characterized in comprising the following steps: detecting at least a value of a level of said ingredient in said container; making a comparison of the detected value with a reference value stored in a machine control unit; and changing one or more operative parameters of said beverage dispensing machine, when necessary, on the basis of said comparison, said step of detecting the value of said level comprises the step of detecting the distance between at least one sensing means positioned above said ingredient and at least one point of an upper surface of said ingredient.

2. The method according to claim 1, wherein said sensing means emits a signal passing through a surface of said container to scan the upper surface of the ingredient contained therein.

3. The method according to claim 1, further comprising detecting a distance between said sensing means and at least two points of the upper surface of said ingredient to provide surface information on a surface shape of said ingredient.

4. The method according to claim 3, further comprising monitoring said surface shape after more than one dispensing operation and comparing the surface information of subsequent dispensing operations to recognize formation of ingredient aggregates.

5. The method according to claim 2, characterized in that said signal is ultrasonic, optic, laser, magnetic or a combination thereof.

6. The method according to claim 1, characterized in that said value of the level is transmitted to a remote monitoring unit.

7. A method of controlling a beverage dispensing machine provided with at least one container containing an ingredient for preparing said beverage, characterized in comprising the following steps: detecting at least a value of a level of said ingredient in said container; making a comparison of the detected value with a reference value stored in a machine control unit; and changing one or more operative parameters of said beverage dispensing machine, when necessary, on the basis of said comparison selecting said at least one or more operative is parameters from the group consisting of an operating time of the machine to draw the ingredient from the container, an amount of ingredient drawn from the container, and an operating time or condition of other machine units.

8. An apparatus for controlling a beverage dispensing machine provided with at least one container containing an ingredient for preparing said beverage, comprising means for detecting at least a value of a level of said ingredient in said container; a machine control unit having means for storing at least one reference value for said level value, means for making a comparison of the detected value with said stored reference values and means of changing one or more operative parameters of said beverage dispensing machine, when necessary, on the basis of said comparison, said means for detecting the value of said level comprises means for detecting distance between at least one sensing means positioned above said ingredient and at least one point of an upper surface of said ingredient.

9. The apparatus according to claim 8, wherein said sensing means is positioned above said container and outside it said sensing means emitting a signal passing through a surface of said container to scan the upper surface of the ingredient contained therein.

10. The apparatus according to claim 9, wherein said sensing means is configured and arranged to detect distance between said sensing means and at least two points of the upper surface of said ingredient and to provide information on a surface shape of said upper surface of said ingredient.

11. The apparatus according to claim 8, wherein said sensor means emits a signal selected from ultrasonic, optic, laser, magnetic signals or a combination thereof, and in further comprising a receiver which receives the signal back from the ingredient surface for processing by a control unit.

12. The apparatus of any claim 11, wherein said sensor means and said receiver are located on a container lid.

13. The apparatus according to claim 11, further comprising transmission means, connected to said control unit, for providing a remote monitoring unit with the detected value.

14. A method of use of the apparatus according to claim 8, comprising controlling operation of a beverage dispensing machine with the apparatus.

15. A method of use of the apparatus according to claim 8, comprising collecting statistical information about consumption of at least one ingredient within a beverage dispensing machine from operation of the apparatus.

16. A dispenser, comprising a beverage dispensing machine configured to prepare and dispense a beverage starting from the ingredient provided within the container, the beverage dispensing machine comprising the apparatus according to claim 8.

17. An apparatus for controlling a beverage dispensing machine provided with at least one container containing an ingredient for preparing said beverage, comprising means for detecting at least a value of a level of said ingredient in said container; a machine control unit having means for storing at least one reference value for said level value, means for making a comparison of the detected value with said stored reference values and means of changing one or more operative parameters of said beverage dispensing machine, when necessary, on the basis of said comparison, said at least one or more operative is parameters being selected from the group consisting of an operating time of the machine to draw the ingredient from the container, an amount of ingredient drawn from the container, and an operating time or condition of other machine units.

* * * * *